United States Patent [19]
Hegler

[11] Patent Number: 5,996,635
[45] Date of Patent: Dec. 7, 1999

[54] COMPOSITE PIPE WITH A SOCKET AND METHOD FOR ITS MANUFACTURE

[76] Inventor: Ralph Peter Hegler, Schillerstrasse 7, D-97688, Bad Kissingen, Germany

[21] Appl. No.: 08/797,457

[22] Filed: Feb. 6, 1997

[30] Foreign Application Priority Data

Feb. 7, 1996 [DE] Germany ............... 196 04 311

[51] Int. Cl.$^6$ ............... F16L 11/04; F16L 9/00
[52] U.S. Cl. ............ 138/109; 138/109; 138/121; 138/137
[58] Field of Search ............... 285/166, 419, 285/146.1, 417, 49; 428/99; 264/508; 138/149, 121, 109, 107, 103, 122

[56] References Cited

U.S. PATENT DOCUMENTS

| | | | |
|---|---|---|---|
| 4,131,407 | 12/1978 | de Putter et al. ............ | 138/109 |
| 4,779,651 | 10/1988 | Hegler et al. ............ | 138/109 |
| 5,071,173 | 12/1991 | Hegler et al. ............ | 285/138 |
| 5,097,871 | 3/1992 | Ohta ............ | 138/149 |
| 5,284,184 | 2/1994 | Noone et al. ............ | 138/121 |
| 5,320,797 | 6/1994 | Hegler et al. ............ | 264/511 |
| 5,460,416 | 10/1995 | Freidrich et al. ............ | 285/166 |
| 5,472,659 | 12/1995 | Hegler et al. ............ | 264/508 |
| 5,619,878 | 4/1997 | Grosjean et al. ............ | 72/56 |
| 5,653,265 | 8/1997 | Nakagawa et al. ............ | 138/121 |
| 5,678,610 | 10/1997 | Scarazzo et al. ............ | 138/109 |

FOREIGN PATENT DOCUMENTS

| | | |
|---|---|---|
| 0135634 | 10/1983 | European Pat. Off. ........ B29C 49/38 |
| 0440566 | 2/1991 | European Pat. Off. ........ F16L 25/00 |
| 1909468 | 10/1964 | Germany . |
| 4325021 | 3/1995 | Germany ............ B29C 47/06 |
| PCT/FI88/ 00005 | 1/1988 | WIPO ............ B29C 47/90 |

OTHER PUBLICATIONS

French Search Report.

*Primary Examiner*—Andres Kashnikow
*Assistant Examiner*—Davis Hwu
*Attorney, Agent, or Firm*—Robert F. I. Conte; Lee, Mann, Smith, McWilliams, Sweeney & Ohlson

[57] ABSTRACT

A composite pipe comprises and internal pipe and a corrugated external pipe and a socket formed in one piece with the internal pipe and the external pipe. This socket has a connecting section of substantially cylindrical shape and at least one reinforcing rib formed on the outside of the connecting section, $a \leq 2b$ applying to the length b of the reinforcing rib in the direction of the central longitudinal axis in relation to its thickness $\underline{a}$ radial to the central longitudinal axis 10.

9 Claims, 4 Drawing Sheets

US 5,996,635

COMPOSITE PIPE WITH A SOCKET AND METHOD FOR ITS MANUFACTURE

BACKGROUND OF THE INVENTION

1. Field of the Invention

The invention relates to a composite pipe and a method of manufacturing same.

2. Background Art

Composite pipes having substantially smooth ends, whether spigots or sockets, are known for instance from U.S. Pat. No. 5,472,659 or EP 0 385 465 B1. The smooth ends, which are produced by the joining and welding of two co-extruded tubes, are formed into sockets by subsequent expansion on a socketing machine. This socketing is comparatively convenient to carry out as long as the composite pipes consist of PVC-U. When polyolefins are used, the socketing, i.e. expanding the spigots or the socket portions not yet expanded, is very difficult. Owing to the partially cristalline material structure of polyolefins, the latter exhibit a so-called memory effect. To solve these problems, AT 398 725 B proposes first to expand such a socket beyond its nominal dimension and then to compress it slightly below its nominal dimension, the memory effect thereby being compensated.

When PVC-U is used as a material for the composite pipes, there is no distinct creeping process, which is however very distinct in the case of polyolefins as a material for composite pipes. Consequently, with such composite pipes of polyolefin, there is the risk that the respective socket expands under the action of the seal bearing against it from inside, the pipe connection thereby becoming leaky.

SUMMARY OF THE INVENTION

It is the object of the invention to embody a composite pipe with a socket molded on in such a way that the pipe connection will be leak-tight in the long run.

According to the invention, this object is attained in a composite pipe comprising an internal pipe; a corrugated external pipe having successive corrugated sections connected with each other by a foot section, the foot sections being welded onto the internal pipe; a common central longitudinal axis; and a socket formed in one piece with the internal pipe and the external pipe, said socket having a connecting section of substantially cylindrical basic shape, and at least one reinforcing rib formed on the outside of the connecting section, $a \leq 2b$ applying to the length b of the reinforcing rib in the direction of the central longitudinal axis in relation to its thickness $\underline{a}$ radial to the central longitudinal axis. The socket exhibits high annular rigidity, which can be set by appropriate dimensioning such that the annular rigidity of the socket on the one hand and the annular rigidity of the composite pipe inserted into it are about the same.

According to the invention, a method for the manufacture of a composite pipe according to the invention comprises the steps of extruding an external tube; deforming the external tube successively and in portions so as in a first portion to form the corrugated sections, which constitute the outer cross-sectional shape of the composite pipe, and in a second portion to form the outer cross-sectional shape of a socket portion with at least one reinforcing rib having a free space; filling the free space in each reinforcing rib; welding together the internal tube and the external tube partially in the first portion, and over the full surface in a second portion; cutting through the continuous pipe in the vicinity of a socket portion; and expanding the socket portion to form a socket.

Details of the invention will become apparent from the ensuing description, taken in conjunction with the drawing.

DESCRIPTION OF THE PREFERRED EMBODIMENT

Figure 1:
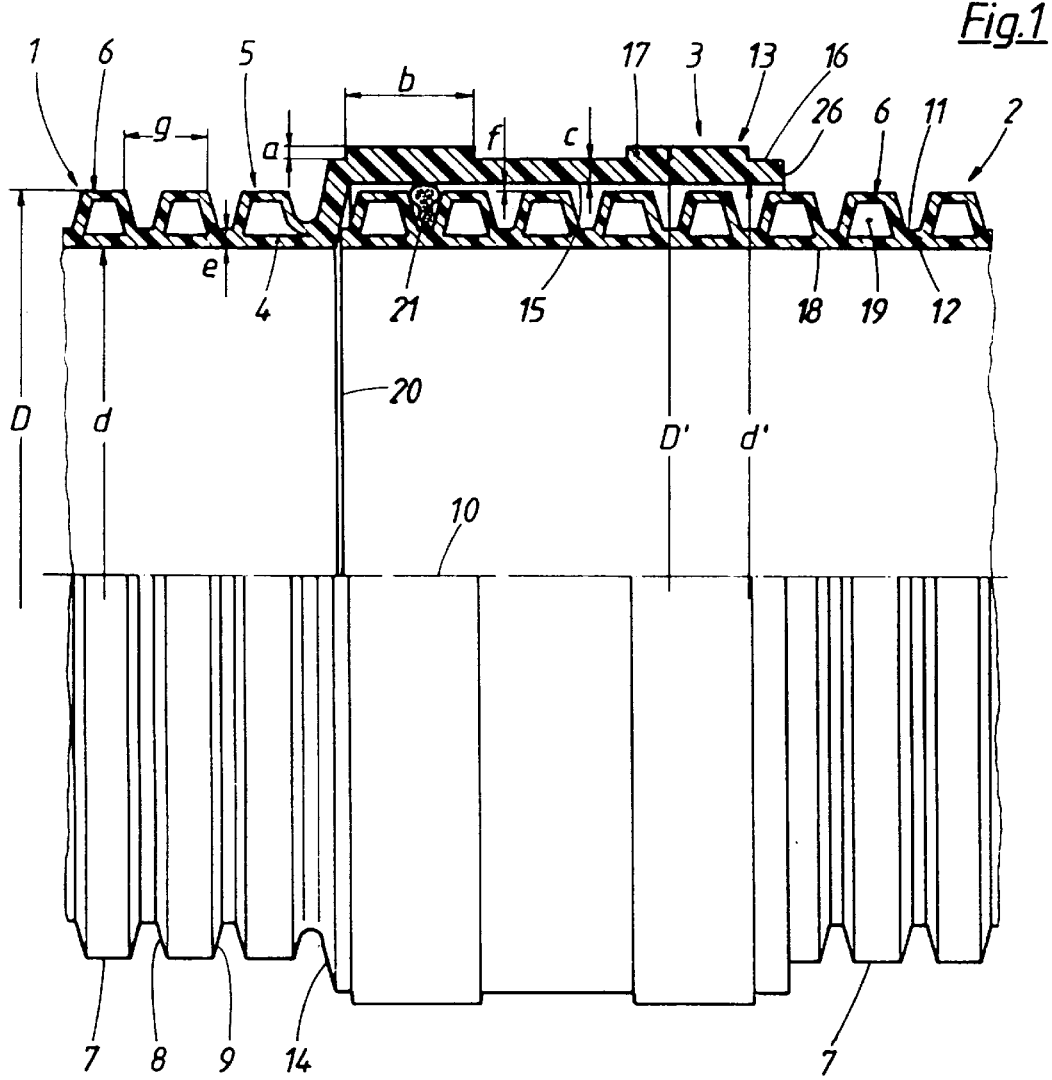
FIG. 1 is a semi-section of a pipe connection of two composite pipes, one of which being provided with a socket.

FIG. 1 illustrates two composite pipes 1, 2 of fundamentally identical structure, which united by means of a socket 3 formed on one composite pipe 1. The composite pipes 1, 2 each have a continuous cylindrical internal pipe 4 and a corrugated external pipe 5. The internal pipe 4 and the external pipe 5 are welded together; the manufacture will be dealt with below. The external pipe 5 is corrugated in cross-section, i.e. it is a gilled pipe. Each corrugated section 6 has the cross-sectional shape of a trapezoid slightly tapering externally. Each corrugated section 6 comprises an external, annular cylindrical outside wall section 7 and two side wall sections 8, 9. Related to the central longitudinal axis 10 of the respective composite pipe 1 or 2, these side wall sections 8, 9 are inclined towards each other radially outwards. The base of the mentioned trapezoid is formed by the respective internal pipe 4. Between two adjacent corrugated sections 6, a corrugation trough 11 is formed, in which the side wall sections 8, 9 of two adjacent corrugated sections 6 are connected with each other by means of an equally annular foot section 12. This is where the external pipe 5 and the internal pipe 4 are welded together.

The socket 3 formed on the composite pipe shown on the left in FIG. 1 has a connecting section 13, the basic shape of which is annular cylindrical and which passes by way of a transition section 14 into a foot portion 12 of the external pipe 5 and at the same place into the internal pipe 4 of the composite pipe 1. In the vicinity of their outside wall sections 7, the composite pipes 1, 2 have an outside diameter D which is slightly smaller than the inside diameter d' of the smooth cylindrical inside wall 15 of the socket 3. The connecting section 13 has reinforcing ribs 17 on its outside 16, which are annular cylindrical related to the basic shape of the connecting section 13. In relation to the central longitudinal axis 10, they have a radial thickness $\underline{a}$ and a length b in the direction of the axis 10. a<b applies in the exemplary embodiment shown. $a \leq b$ applies as an intermediate limiting value and $a \leq 2b$ applies as the extreme limiting value. The reinforcing ribs 17 not taken into account, the wall thickness c of the socket 3 will as a rule exceed the sum of the wall thicknesses e of the composite pipe in the vicinity of the foot portion 12. As a rule, e<c applies. However, $e \leq c$ may also apply. The inside wall 18 of the internal pipe 4 has a diameter d. The socket has its maximum outside diameter D' in the vicinity of the reinforcing ribs 17.

(D'−d')/2<(D−d)/2 applies to the maximum wall thickness (D−d)/2 of the composite pipe 1 or, respectively, in comparison to the maximum wall thickness (D'−d')/2 of the socket 3. As seen in FIG. 1, the socket 3 is solid, it does not possess the cavities 19 formed in the respective corrugated section 6.

During mounting, a packing ring 21 is placed into a corrugation trough 11 that adjoins the front 20 of the composite pipe 2 and, with its front 20 ahead, the composite pipe 2 is pushed into the socket 3 on the composite pipe 1. Since the packing ring 21 projects radially over the outside wall sections 7 of the adjacent corrugated sections 6, it comes to bear against the inside wall 15 of the connecting section 13 of the socket 3 and is compressed radially to the diameter d' of the inside wall 15 with a corresponding sealing effect being produced. The play f resulting from the difference d'−D=f between the annular outside wall sections 7 of the composite pipe 2 and the inside wall 15 of the socket 3 is very small; depending on the pipe diameter D—it is in the range of some tenths of a millimeter to few millimeters. In the embodiment of FIG. 1, the corrugated sections 6 have a spacing g in the direction of the axis 10, to which g<b applies in comparison to the length b of the reinforcing ribs 17.

Figure 2:
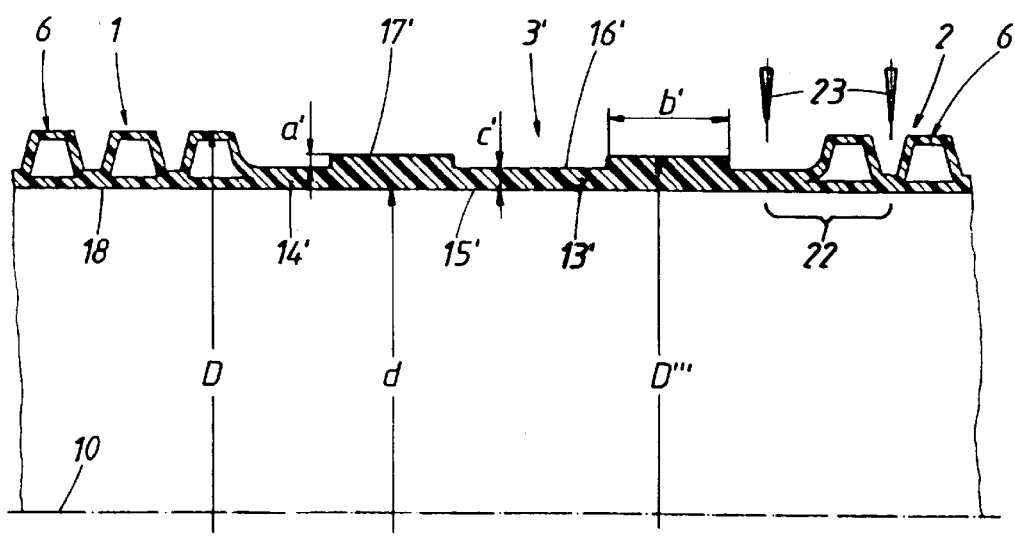
FIG. 2 is a longitudinal section of a pre-product for a composite pipe with a socket.

FIG. 2 illustrates an intermediate product from which the composite pipe 1 with the socket 3 and the subsequent composite pipe 2 are formed. Identical parts have identical reference numerals. The parts from which the socket 3 is made are denoted by the same reference numerals provided with a prime. The pipe section of the composite pipe 1 and a socket portion 3' and the subsequent composite pipe 2 are formed in one piece. A waste section 22 is situated between the connecting section 13' of the socket portion 3' and the composite pipe 2 and is removed by two cuts roughly outlined by cutting knives 23. In this intermediate product, the socket portion 3' still has an inside diameter d which is identical to the inside diameter d of the composite pipes 1 and 2, respectively. The outside diameter D'" of the socket portion 3' in the vicinity of the reinforcing ribs 17' is smaller than the outside diameter D of the composite pipes 1, 2. As compared with the final product according to FIG. 1, b≅b' and a/c≅a'/c' applies to the axial length b' of the reinforcing ribs 17', to their thickness a' and to the wall thickness c'.

Figure 3:
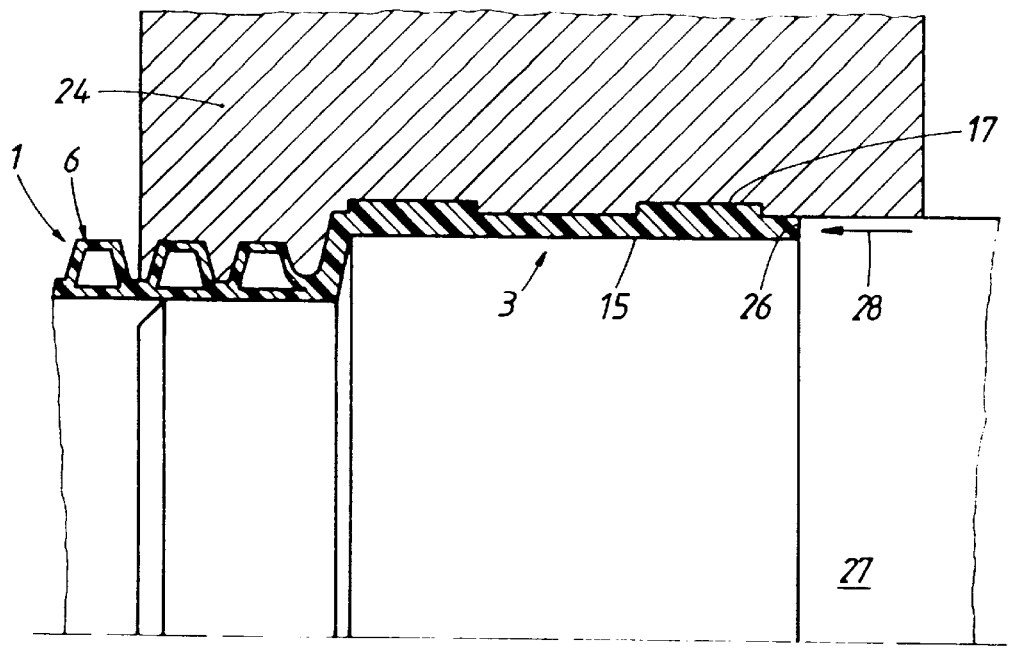
FIG. 3 is a longitudinal section illustrating the pre-product being expanded to form a socket.

As an illustration of principle, FIG. 3 shows the expansion of the socket portion 3' of FIG. 2 to form the socket 3. To this end, the socket portion 3' is plasticised by heating in a heating station of a so-called socketing machine. Then the socket portion 3' is expanded in a station of the socketing machine that is separate from the heating station. To this end, it is held in a mold 24. A mandrel 27 resting on the inside wall of the socket portion 3' and on the latter's front 26 is inserted into the socket portion 3' in the direction 28. An expanding core can be used instead of the mandrel 27. The socket portion 3' is expanded beyond the nominal dimension d', which is why the socket seen in FIG. 1 has the reference numeral 3. In an upsetting station, which is again separate spatially, the expanded socket 3 is compressed below the nominal dimension for the socket 3 to take the shape seen and described in FIG. 1 without any subsequent shrinking. This is a case of compensation of the so-called memory effect. The composite pipe 1 with the socket 3, same as the composite pipe 2, consist of a polyolefin, in particular of polyethylene or polypropylene.

Figure 4:
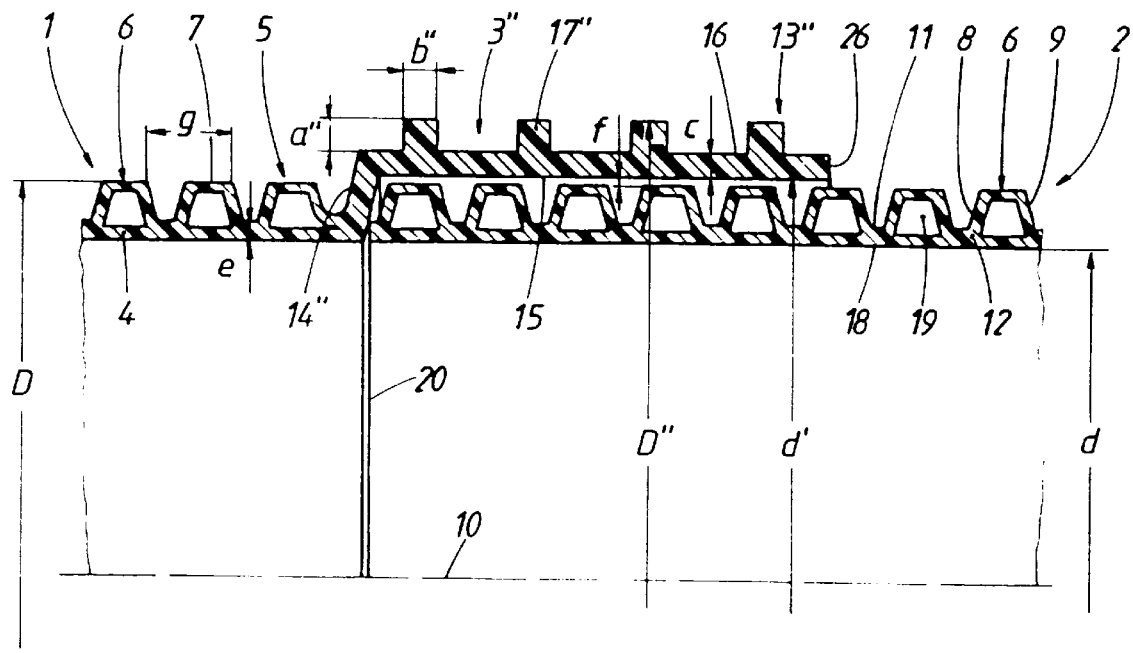
FIG. 4 is an illustration corresponding to FIG. 1 of a pipe connection with a socket modified as compared with FIG. 1.

FIG. 4 illustrates a pipe connection which differs from that according to FIG. 1 only in that the reinforcing ribs 17" exhibit a length b" in the direction of the axis 10 that is smaller than the length b in the embodiment according to FIG. 1. The radial thickness $\underline{a}$" slightly exceeds that in the embodiment according to FIG. 1. In this case, too, a"<b" is illustrated. Fundamentally, a"≦b" applies as an intermediate limiting value and a"≦2b" applies as an extreme limiting value. All the parts that differ only in dimension from the embodiment according to FIG. 1 are denoted by the same reference numeral provided with a double prime, there being no need of renewed description.

The production of the intermediate product seen in FIG. 2 takes place on an apparatus for the manufacture of composite plastic pipes, the basic structure of which is known and illustrated and described for instance in U.S. Pat. No. 5,320,797.

Figure 5:
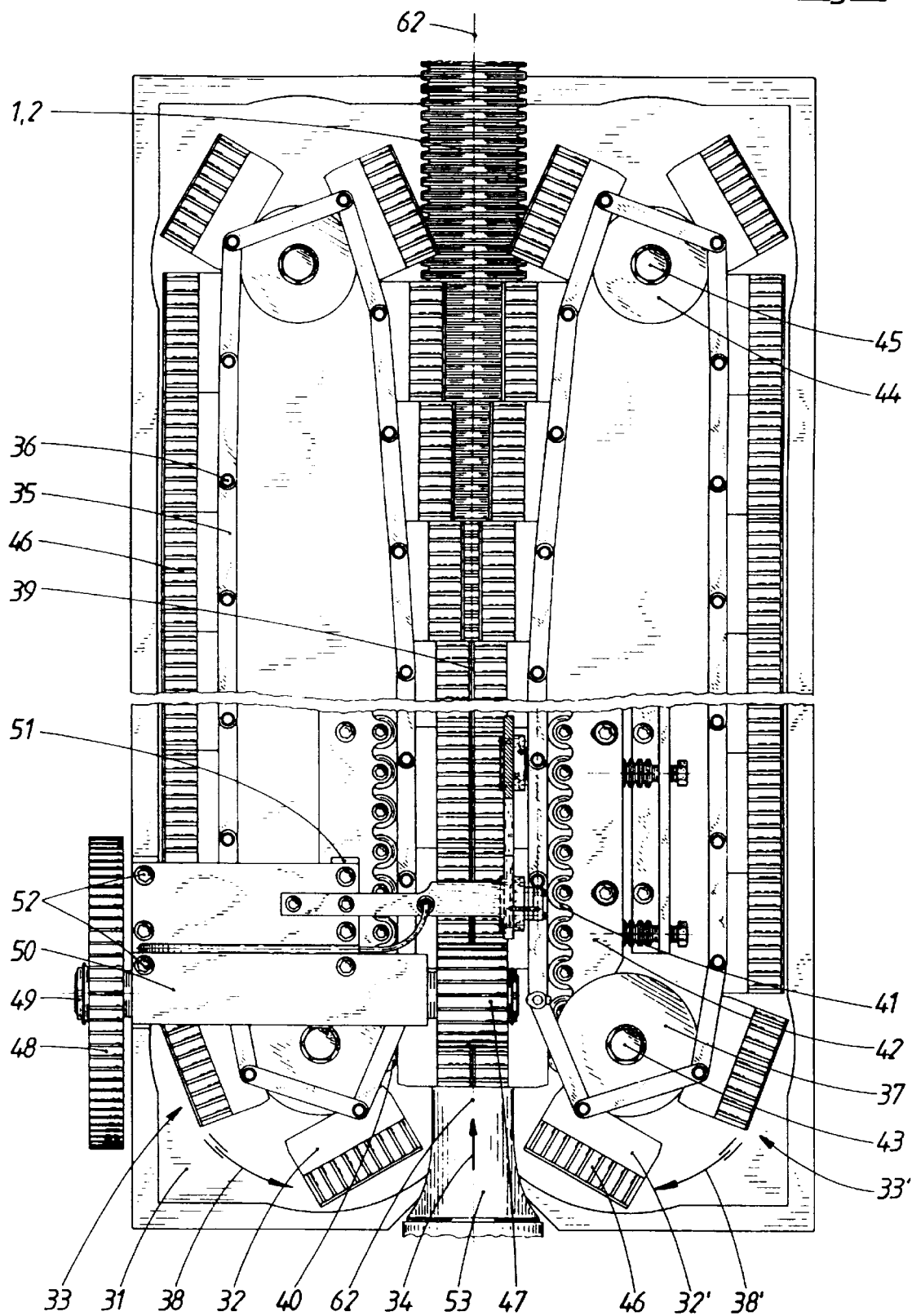
FIG. 5 is a plan view of an apparatus for the manufacture of a composite pipe.

As seen in FIG. 5, the apparatus for the manufacture of the corrugated composite plastic pipes comprises a machine bed 31, on which half shells 32 and 32' are disposed, joined to each other to form two so-called chains 33 and 33'. To this end, a fish plate 35 is articulated to an external portion, leading in the direction of production 34, of each half shell 32 and 32' by means of a coupling bolt 36, this fish plate being fixed to a corresponding place of the following half shell 32 and 32' likewise by means of such a coupling bolt 36. At their rear end seen in the direction of production 34, the chains 33, 33' thus formed are guided over deflection wheels serving as so-called feed rollers 37. When the chains 33, 33' circulate, the individual half shells 32, 32' are piloted corresponding to the arrows 38 and 38' into a molding path 39, where two half shells 32, 32' are united to form a pair of shells, successive pairs of shells in the direction of production 34 lying close together. For the half shells 32, 32' to close rapidly to take a parallel and adjoining position, so-called closing rollers 40 are provided to accelerate the unification of the rear end seen in the direction of production 34 of the half shells 32, 32'.

On the molding path 39 itself, the adjoining half shells 32, 32' are pressed against each other by means of guide rollers 41 that are rotatably run in guide rails 42. The feed rollers 37 are mounted on the machine bed 31 rotatably about axle ends 43. At the front end seen in the direction of production 34 of the machine bed 31, return rollers 44 are positioned rotatably about axle ends 45, which likewise serve as deflection wheels and around which the chains 33 and 33' are deflected and guided back to the feed rollers 37. As seen in FIG. 5, the guide rails 42 comprising the guide rollers 41 end ahead of the return rollers 44 by the length of several half shells 32 and 32' so that the half shells 32 and 32' can again be moved away from each other in parallel and at right angles to the direction of production 34 before they are deflected by the return rollers 44.

A toothing 46 is provided on the upper side of the half shells 32, 32', the two toothings 46 of the half shells 32, 32' allocated to each other by twos being in alignment so that a common driving pinion 47 can reach from above into this toothing 46, moving the half shells 32, 32' on the molding path 39 as a closed mold through the molding path 39. Conventionally, the drive of this driving pinion 47 is effected by a motor (not shown) via a driving gear 48 which is non-rotatably fixed to a shaft 49, the shaft 49 carrying the driving pinion 47. The shaft 49 is run in a bearing 50 which is supported by spacers 51 on the machine bed 31 and tightly joined to the latter by means of fasteners 52.

The apparatus shown serves for continuously manufacturing the composite pipes 1, 2 with socket portions 3' in between them. To this end, provision is made for an extruder, of which only an injection head 53 is roughly outlined.

It comprises a nozzle body 54, the details of which are generally known for instance from U.S. Pat. No. 5,320,797.

Figure 6:
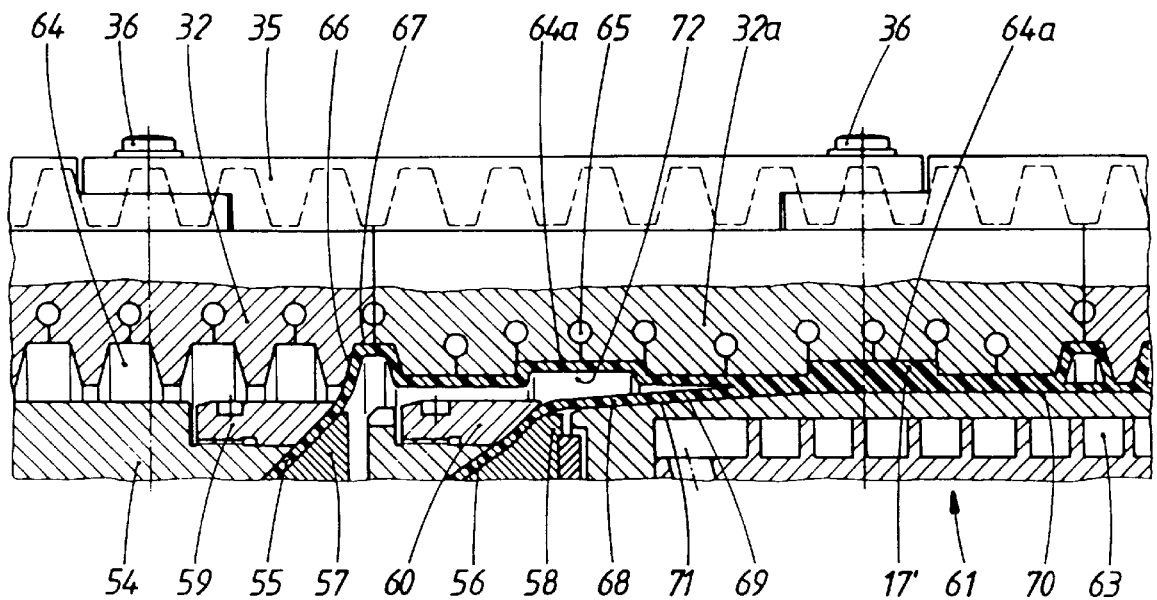
FIG. 6 is a vertical partial section through the apparatus according to FIG. 5.
Figure 7:
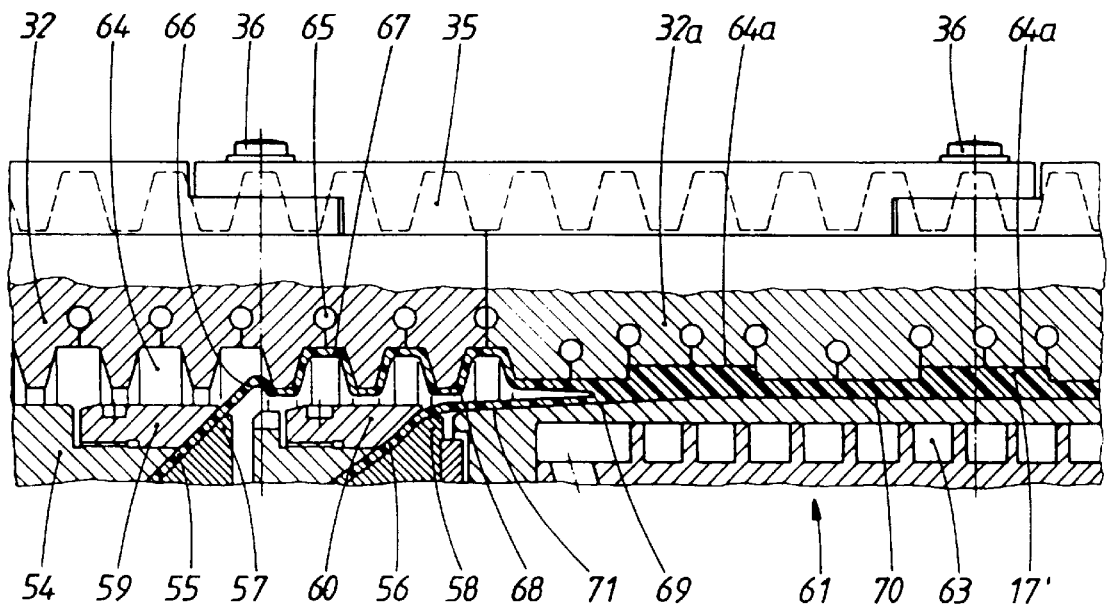
FIG. 7 is a vertical partial section corresponding to FIG. 6 at a different stage of production.

The design of the injection head 53 at the beginning of the molding path 39 is shown in FIG. 6. An outer channel 55 and an inner channel 56 for plastic melt supplied by the extruder are formed in the nozzle body 54. At its end, the outer channel 55 opens into an outer nozzle 57 and the inner channel 56 into an inner nozzle 58. The dimensions of both nozzles 57, 58 can be set by means of nozzle rings 59, 60. On the nozzle body 54 provision is made for a calibrating mandrel 61 in the form of a temperature-regulating bell, which is likewise disposed concentrically of the central longitudinal axis 62 of the molding path 39. Internally, the calibrating mandrel 61 is provided with temperature-regulating channels 63, through which is piloted a coolant or heating agent. As seen in FIGS. 6 and 7, annular mold recesses 64 are formed in the half shells—of which only the half shells 32 are illustrated in these figures; in known manner, the annular mold recesses 64 are connected to partial vacuum channels 65. The plastic melt supplied by the extruder partially flows through the outer channel 55 to the outer nozzle 57, out of which an external tube 66 is extruded, which places itself into the mold recesses 64 because of the partial vacuum, forming a tube 67 provided with the corrugated sections 6. After cooling and curing, it forms the corrugated external pipe 5 of the composite pipe 1 or 2.

Another part of the melt flows through the inner channel 56 to the inner nozzle 58, from which is extracted another tube, i.e. an internal tube 68, that arrives at the calibrating mandrel 61. In the neighborhood of the inner nozzle 58 and directly behind the latter—seen in the direction of production 34—the calibrating mandrel 61 has an elongated conical portion 69, the starting portion of which—referred to the direction of production 34—has an inside diameter smaller than the adjoining cylindrical calibrating section 70 of the calibrating mandrel 61 into which passes the conical portion 69.

The half shell 32a, to which belongs a second, corresponding half shell (not shown), is provided with mold recesses 64a for formation of the socket portion 3' with the reinforcing ribs 17' instead of the mold recesses 64 for formation of the corrugated sections 6. As seen in FIG. 6, the external tube 66 is also extruded into the mold recesses 64a, placing itself as a tube on their wall. At the beginning, the mold recess 64a is not completely filled. The internal tube 68 flows along the wall 71 of the calibrating mandrel 61 that defines the conical portion 69, at the beginning not yet having any contact with the external tube 66—as seen in FIG. 6. Ahead of the transition between the wall 71 and the calibrating section 70, plastic melt of the external tube 66 supplied in excess builds up and serves to fill the mentioned, initially free space 72 in the reinforcing ribs 17' to be produced. While this free space 72 is still available in the illustration of FIG. 6, it does no longer exist in the progressed stage of production seen in FIG. 7. For the required additional quantity of plastic melt to be supplied, the mold runs more slowly during the manufacture of the socket portion 3'. The excess plastic melt collected in the conical portion 69 serves to fill the free spaces 72. The volume of the conical portion 69 must be coordinated such that this function can be fulfilled accurately without the plastic melt being pressed counter to the direction of production 34 into the portion between the inner nozzle 58 and the outer nozzle 57. In the vicinity of the calibrating section 70, the internal tube 68 and the external tube 67 are welded together at their spots of contact.

What is claimed is:

1. A twin wall pipe comprising:
   an internal pipe (4);
   a corrugated external pipe (5) having successive corrugated sections (6) connected with each other by foot sections (12), the foot sections (12) being welded onto the internal pipe (4);
   a common central longitudinal axis (10); and
   a socket (3) formed in one piece with the internal pipe (4) and the external pipe (5), said socket (3) having a connecting section (13) with an essentially smooth cylindrical inside wall (15), an outside of substantially cylindrical basic shape, and at least one reinforcing rib (17) formed on the outside of the connecting section (13), said reinforcing rib (17) having a length b in the direction of the central longitudinal axis (10) and a thickness a radial to the central longitudinal axis (10), whereby a≦2b applies.

2. A twin wall pipe according to claim 1, wherein to the length b and the thickness a applies: a≦b.

3. A twin wall pipe according to claim 2, wherein to the length b and the thickness a applies: a<b.

4. A twin wall pipe comprising:
   an internal pipe (4);
   a corrugated external pipe (5) having successive corrugated sections (6) connected with each other by foot sections (12), the foot sections (12) being welded onto the internal pipe (4);
   a common central longitudinal axis (10); and
   a socket (3) formed in one piece with the internal pipe (4) and the external pipe (5), said socket (3) having a connecting section (13) with an essentially smooth cylindrical inside wall (15), an outside of substantially cylindrical basic shape, and at least one reinforcing rib (17) formed on the outside of the connecting section (13), said reinforcing rib (17) having a length b in the direction of the central longitudinal axis (10) and a thickness a radial to the central longitudinal axis (10), whereby a<2b applies, wherein the twin wall pipe consists of a polyolefin plastic material.

5. A twin wall pipe according to claim 1, wherein the socket (3) has an inside diameter d' and wherein the twin wall's pipe (1, 2) has an outside diameter D, and wherein the inside diameter d' slightly exceeds the outside diameter D.

6. A method for the manufacture of a twin wall pipe comprising
   an internal pipe (4);
   a corrugated external pipe (5) having successive corrugated sections (6) connected with each other by foot sections (12), the foot sections (12) being welded onto the internal pipe (4);
   a common central longitudinal axis (10); and
   a socket (3) formed in one piece with the internal pipe (4) and the external pipe (5), said socket (3) having a connecting section (13) with an outside of substantially cylindrical basic shape, and at least one reinforcing rib (17) formed on the outside of the connecting section (13), said reinforcing rib (17) having a length b in the direction of the central longitudinal axis (10) and a thickness a radial to the central longitudinal axis (10), whereby a≦2b applies:
comprising:
   continuously extruding an external tube (66) of molten plastic material;
   deforming the external tube (66) successively and in portions
      in a first portion to form the corrugated sections (6), which form an outer cross-sectional shape to of the twin wall pipe (1, 2), and in a second portion to form an outer cross-sectional shape of a socket portion (3') with at least one reinforcing rib (17') having a free space (72);

in continuously extruding an internal tube (68) of molten plastic material into said external tube (66);

filling the free space (72) in each reinforcing rib (17') with molten plastic material of the internal tube (68);

welding together the internal tube (68) and the external tube (66)

partially in the first portion, and in the second portion, over full surfaces of the internal tube (68) and the external tube (66);

cutting through the pipe in the vicinity of a socket portion (3'); and expanding the socket portion (3') to form a socket (3).

7. A twin wall pipe according to claim 4, wherein to the length b and the thickness a applies: $a \leqq b$.

8. A twin wall pipe according to claim 7, wherein to the length b and the thickness a applies: $a \leqq b$.

9. A twin wall pipe according to claim 4, wherein the socket (3) has an inside diameter d' and wherein the twin wall pipe (1, 2) has an outside diameter D, and wherein the inside diameter d' slightly exceeds the outside diameter D.

* * * * *